(12) United States Patent
Van Wiemeersch et al.

(10) Patent No.: US 10,257,730 B1
(45) Date of Patent: Apr. 9, 2019

(54) STATUS TESTS OF WIRELESS COMMUNICATION NODES OF VEHICLES

(71) Applicant: Ford Global Technologies, LLC, Dearborn, MI (US)

(72) Inventors: John Robert Van Wiemeersch, Novi, MI (US); David McNabb, Ann Arbor, MI (US); Kevin Thomas Hille, Plymouth, MI (US); Vivekanandh Elangovan, Canton, MI (US); Timothy Thivierge, Jr., Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/823,084

(22) Filed: Nov. 27, 2017

(51) Int. Cl.
| | |
|---|---|
| *H04B 17/00* | (2015.01) |
| *H04W 24/08* | (2009.01) |
| *B60R 25/24* | (2013.01) |
| *H04L 29/08* | (2006.01) |
| *H04W 4/80* | (2018.01) |
| *H04L 12/40* | (2006.01) |

(52) U.S. Cl.
CPC ............. *H04W 24/08* (2013.01); *B60R 25/24* (2013.01); *H04L 67/125* (2013.01); *H04W 4/80* (2018.02); *H04L 2012/40273* (2013.01)

(58) Field of Classification Search
CPC ....... H04W 24/08; H04W 4/80; H04W 4/008; H04L 67/125; B60R 25/24
USPC ...................................................... 455/226.2
See application file for complete search history.

(56) References Cited

U.S. PATENT DOCUMENTS

| | | | |
|---|---|---|---|
| 8,386,122 B1 * | 2/2013 | Collins | ................ G01M 17/08 701/31.1 |
| 9,625,510 B2 | 4/2017 | Patel et al. | |
| 2014/0188309 A1 | 7/2014 | Caratto et al. | |
| 2014/0274013 A1 | 9/2014 | Santavicca | |
| 2016/0134383 A1 | 5/2016 | Banasky, Jr. | |
| 2017/0136992 A1 | 5/2017 | Hamada et al. | |
| 2017/0200334 A1 | 7/2017 | Buttolo et al. | |

* cited by examiner

*Primary Examiner* — Sanh D Phu
(74) *Attorney, Agent, or Firm* — Frank Lollo; James P. Muraff; Neal, Gerber & Eisenberg LLP

(57) ABSTRACT

Method and apparatus are disclosed for status tests of wireless communication nodes of vehicles. An example vehicle includes communication nodes including a first node and a second node. The first node is to send a first of test signals to and receive a second of the test signals from the second node. The example vehicle also includes a controller to determine signal strengths of the test signals and at least partially disable passive entry passive start responsive to determining one or more of the communication nodes is impaired based upon the signal strengths.

20 Claims, 4 Drawing Sheets

STATUS TESTS OF WIRELESS COMMUNICATION NODES OF VEHICLES

TECHNICAL FIELD

The present disclosure generally relates to communication nodes and, more specifically, to status tests of wireless communication nodes of vehicles.

BACKGROUND

Typically, keys are utilized to open doors of a vehicle and to activate an engine of the vehicle. Traditionally, mechanical keys have been utilized to open vehicle doors and to activate vehicle engines. For instance, a mechanical key is inserted into a keyhole and rotated to unlock a door and/or to activate an engine. Recently, key fobs and phone-as-a-keys have been utilized to unlock and/or open vehicle doors and to activate vehicle engines. For instance, a key fob and/or phone-as-a-key wirelessly communicates with a vehicle to unlock a vehicle door and/or to activate an engine.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for status tests of wireless communication nodes of vehicles. An example disclosed vehicle includes communication nodes including a first node and a second node. The first node is to send a first of test signals to and receive a second of the test signals from the second node. The example disclosed vehicle also includes a controller to determine signal strengths of the test signals and at least partially disable passive entry passive start responsive to determining one or more of the communication nodes is impaired based upon the signal strengths.

In some examples, the controller determines that one of the communication nodes is impaired responsive to identifying that one of the signal strengths corresponding to the one of the communication nodes is less than a first threshold signal strength or greater than a second threshold signal strength. In some examples, the communication nodes include short-range wireless communication modules. In some examples, the first node is a master node dedicated for communication with other of the communication nodes. In some examples, the first node is configured to communicate with a mobile device for passive entry passive start. In some examples, the communication nodes send the test signals in a bonded mode of at least one of a Bluetooth® low-energy communication protocol and a Wi-Fi communication protocol. In some examples, the communication nodes further include a third node, the first node is to send a third of the test signals to and receive a fourth of the test signals from the third node.

In some examples, the communication nodes include an exterior node configured to wirelessly communicate with a mobile device to initiate passive entry into a vehicle cabin. In some such examples, the controller is to disable passive entry through a first vehicle door adjacent to the exterior node responsive to identifying that the exterior node is impaired. In some such examples, the controller is to permit passive entry through a second vehicle door spaced apart from the exterior node that is impaired. In some such examples, the controller is to provide an instruction to a user of the mobile device to access the vehicle cabin in another manner other than passive entry through the first vehicle door.

In some examples, the communication nodes include an interior node configured to wirelessly communicate with a mobile device within a vehicle cabin to initiate passive start of a vehicle engine. In some such examples, the controller is to disable passive start of the vehicle engine responsive to identifying that the interior node is impaired. In some such examples, the controller is to provide an instruction to a user of the mobile device to start the vehicle engine in another manner other than passive start.

Some examples further include an ignition switch sensor to monitor a status of a vehicle engine. In such examples, the communication nodes are to send the test signals responsive to the ignition switch sensor detecting a status change of the vehicle engine. Some examples further include an impact sensor to monitor for a vehicle collision event and a hard braking event. In such examples, the communication nodes are to send the test signals responsive to the impact sensor detecting at least one of the vehicle collision event and the hard braking event. Some examples further include a sensor configured to record at least one of a temperature measurement and a humidity measurement that is utilized by the controller to normalize the signal strengths with baselines readings.

An example disclosed method includes sending a first of test signals from a first node to a second node of communication nodes and receiving a second of the test signals at the first node from the second node. The example disclosed method also includes determining, via a processor, signal strengths of the test signals and at least partially disabling passive entry passive start responsive to determining one or more of the communication nodes is impaired based upon the signal strengths.

Some examples further include determining one of the communication nodes is impaired responsive to identifying that one of the signal strengths corresponding to the one of the communication nodes is less than a first threshold signal strength or greater than a second threshold signal strength. In some examples, at least partially disabling passive entry passive start includes at least one of disabling passive entry through a vehicle door adjacent to an exterior node of the communication nodes responsive to identifying that the exterior node is impaired and disabling passive start of a vehicle engine responsive to identifying that an interior node of the communication nodes is impaired.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
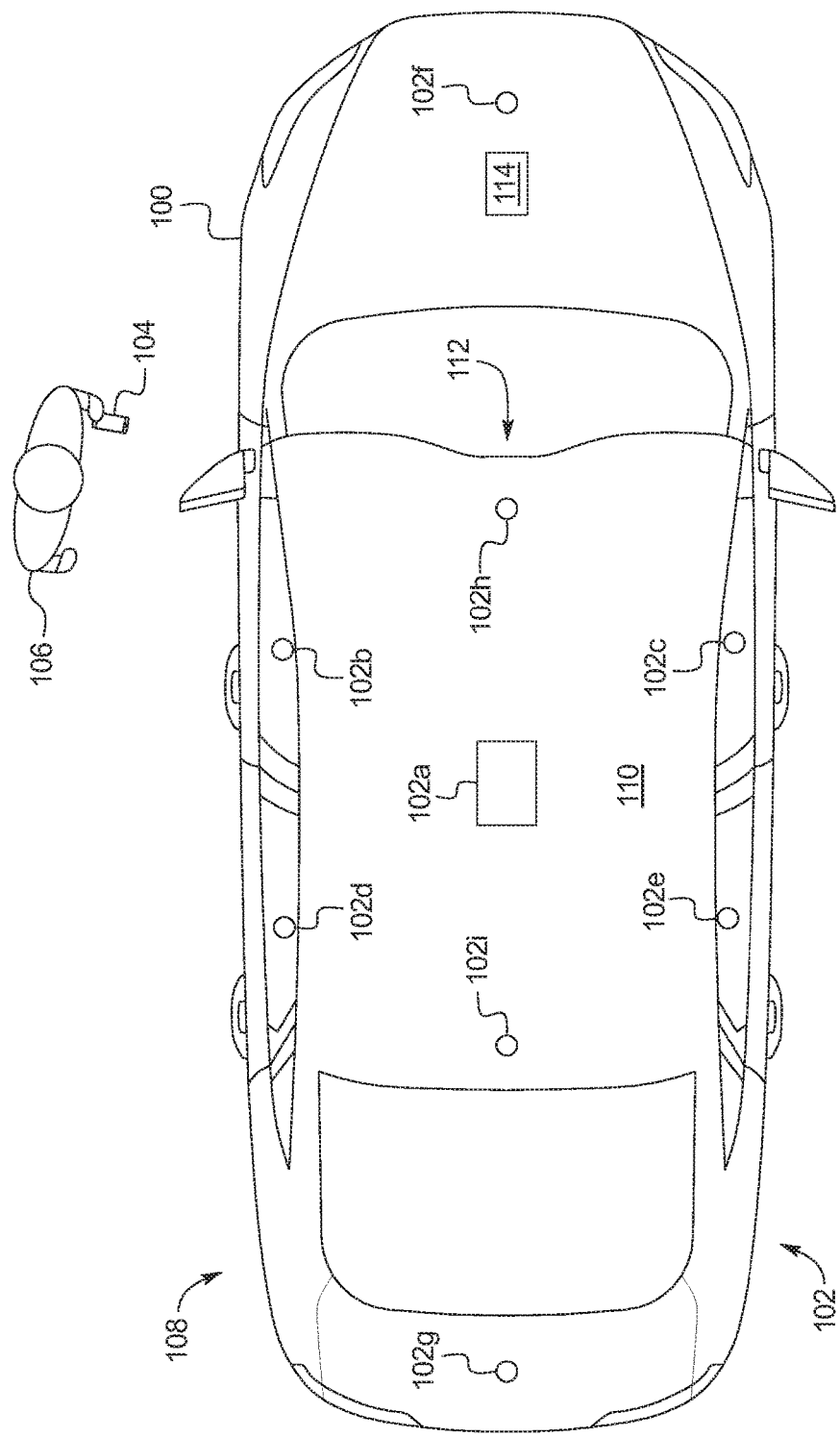
FIGS. 1A-1B illustrate an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, keys are utilized to open doors of a vehicle and to activate an engine of the vehicle. Traditionally, mechanical keys have been utilized to unlock vehicle doors and to activate vehicle engines. For instance, a mechanical key is inserted into a keyhole and rotated to unlock a door and/or to activate an engine. Recently, key fobs and phone-as-a-keys have been utilized to unlock and/or open vehicle doors and to activate vehicle engines. For instance, a key fob and/or phone-as-a-key wirelessly communicates with a vehicle to unlock a vehicle door and/or to activate a vehicle engine.

Some vehicles include one or more communication devices that are configured to wirelessly communicate with a key fob and/or phone-as-a-key to initiate opening of a vehicle door and/or activation of a vehicle engine when the key fob and/or phone-as-a-key is near and/or within the vehicle. For instance, some vehicles may unlock a door upon one or more communication devices identifying that a key fob and/or phone-as-a-key is nearby a door of the vehicle and may activate an engine upon one or more of the communication devices identifying that the key fob and/or phone-as-a-key is within the vehicle. In some instances, one or more of the communication devices may be impaired such that communication with the key fob and/or phone-as-a-key is prevented. In such instances, the vehicle potentially may be unable to detect a location of the key fob and/or phone-as-a-key relative to the vehicle and, thus, unable to unlock a door and/or activate an engine based upon wireless communication with the key fob and/or phone-as-a-key. Further, in such instances, a user potentially may be unaware as to why the vehicle is not unlocking the door and/or activating the engine when the key fob and/or phone-as-a-key is nearby and/or within the vehicle.

Example methods and apparatus disclosed herein monitor communication modules or nodes (e.g., Bluetooth® low energy or BLE modules) of a vehicle that are utilized for a passive entry and/or passive start system of the vehicle, at least partially disable the passive entry and/or passive start system upon detecting that one or more of the communication nodes is impaired, and/or subsequently instructs a user to enter and/or start the vehicle in another manner. Examples disclosed herein include a system that tests the functionality of communication nodes periodically and/or upon detection of an event associated with potential communication node damage and/or dislodgement. A first of the communication nodes receives a test signal from each of the other communication nodes and identifies a received signal strength indicator (RSSI) for each of the received test signals. Further, each of the other communication nodes receives a test signal from the first of the communication nodes, identifies the RSSI of the test signal, and sends the RSSI via a wired connection to the first of the communication nodes. The system compares each of the RSSIs to a corresponding minimum and maximum signal strength to determine whether the each of the communication nodes is functioning properly. In some examples, the system may record temperature and humidity for use to normalize new RSSI samples with baselines readings stored by the system. If the system detects that one or more of the communication nodes is impaired, the system provides an alert to an operator of the vehicle, reduces functionality of passive entry and/or passive start of the vehicle, and/or provides alternative means to enter and/or start the vehicle.

As used herein, "passive entry" and "passive-entry" refer to a system of a vehicle that unlock(s) and/or open(s) one or more doors of the vehicle upon detecting that a key fob and/or a phone-as-a-key is proximate to and/or approaching a door of the vehicle. Some passive entry systems unlock and/or open a door in response to detecting a key fob and/or a phone-as-a-key. Further, some passive entry systems trigger a door for opening in response to detecting a key fob and/or a phone-as-a-key such that the door unlocks upon detecting that a user has touched a handle of the corresponding door. As used herein, "passive start" and "passive-start" refer to a system of a vehicle that activates ignition of an engine of the vehicle upon detecting that a key fob and/or a phone-as-a-key is within a cabin of the vehicle such that drive-away is enabled. Some passive start systems activate ignition of the engine in response to detecting a key fob and/or a phone-as-a-key. Further, some passive start systems trigger an engine for ignition in response to detecting a key fob and/or a phone-as-a-key such that the ignition of the engine is started when an ignition button within the cabin of the vehicle is pressed. As used herein, "passive entry passive start," "passive-entry passive-start," and "PEPS" refer to a system of vehicle that is configured to perform passive entry and/or passive start for the vehicle.

As used herein, a "key fob" refers to an electronic device that wirelessly communicates with a vehicle to unlock and/or lock one or more vehicle doors, open and/or close one or more of the vehicle doors, activate an engine of the vehicle, and/or initiate other function(s) of the vehicle. In some examples, a user of a vehicle utilizes a mobile device that functions as a phone-as-a-key for wireless communication with the vehicle. As used herein, a "phone-as-a-key" refers to a mobile device (e.g., a smart phone, a wearable, a smart watch, a tablet, etc.) that includes hardware and/or software to perform functions as a key fob.

Figure 1B:
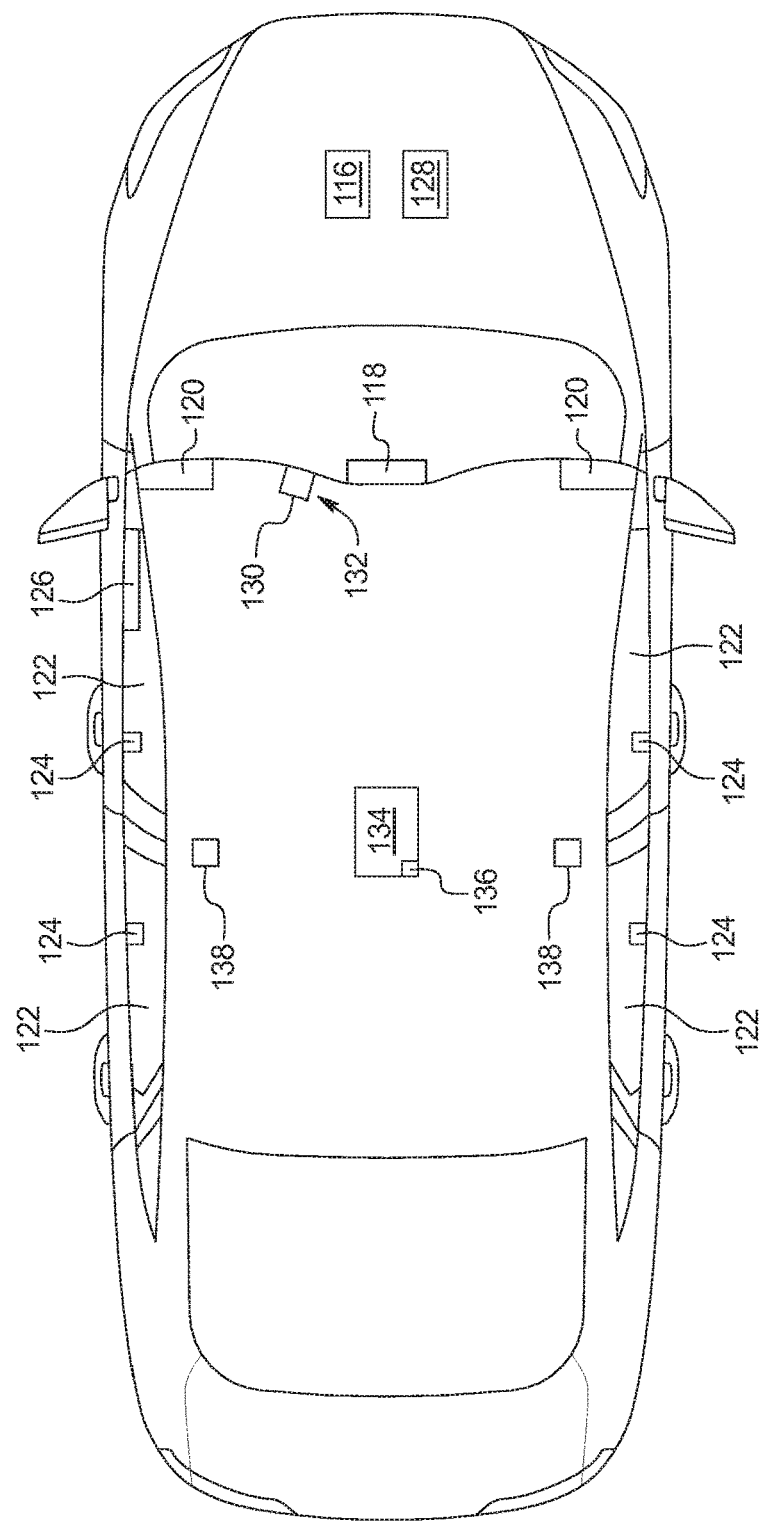

Turning to the figures, FIGS. 1A-1B illustrate an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1A, the vehicle 100 includes communication nodes 102. In the illustrated example, each of the communication nodes 102 is configured to communicatively connect to a mobile device 104 of a user 106 (e.g., an operator such as a driver) of the vehicle 100. Each of the communication nodes 102 includes hardware and firmware to establish a wireless connection with a key fob and/or a mobile device (e.g., the mobile device 104). For example, the communication nodes 102 are short-range wireless modules that wirelessly communicate with key fob(s) and/or mobile device(s) (e.g., the mobile device 104) via short-range wireless communication protocols. In some examples, the communication nodes 102 implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication nodes 102 may use Wi-Fi, WiMax, NFC, UWB (Ultra-Wide Band), and/or any other communication protocol that enables the communication nodes 102 to communicatively couple to the mobile device 104.

The communication nodes 102 are utilized to detect when the mobile device 104 is approaching a door of the vehicle 100, is near a door of the vehicle 100, and/or is within the vehicle 100. For example, a location of the mobile device 104 relative to the vehicle 100 is determined utilizing triangulation and/or trilateration based on signals strengths of communication between the communication nodes 102 and the mobile device 104. In the illustrated example, the communication nodes 102 include a communication node 102a (e.g., a first communication node), a communication node 102b (e.g., a second communication node), a communication node 102c (e.g., a third communication node), a communication node 102d (e.g., a fourth communication node), a communication node 102e (e.g., a fifth communication node), a communication node 102f (e.g., a sixth communication node), a communication node 102g (e.g., a seventh communication node), a communication node 102h (e.g., an eighth communication node), and a communication node 102i (e.g., a ninth communication node).

The communication nodes 102b, 102c, 102d, 102e, 102f, 102g of the illustrated example are exterior nodes 108 of the communication nodes 102. For example, the exterior nodes 108 are utilized to detect when the mobile device 104 is near and/or approaching a door of the vehicle 100. Further, in some examples, the exterior nodes 108 are utilized to detect when the mobile device 104 is within a cabin 110 of the vehicle 100. In the illustrated example, the exterior nodes 108 are positioned and oriented to communicatively couple to the mobile device 104 when the mobile device 104 is located outside of the cabin 110 of the vehicle 100. That is, each of the communication nodes 102b, 102c, 102d, 102e, 102f, 102g is located near an exterior of the vehicle 100 and oriented in a direction away from the cabin 110 to communicatively couple to the mobile device 104 when the mobile device 104 is outside of the cabin 110. For example, the exterior nodes 108 are configured to communicatively couple to the mobile device 104 to enable passive entry into the cabin 110 of the vehicle 100. Further, the exterior nodes 108 may be configured to communicatively couple to the mobile device 104 when the mobile device 104 is within the cabin 110 to enable passive start of the vehicle 100. In the illustrated example, the communication node 102b is positioned and oriented to communicatively couple to the mobile device 104 when the mobile device 104 is proximate to a front driver-side portion of the vehicle 100. The communication node 102c is positioned and oriented to communicatively couple to the mobile device 104 when the mobile device 104 is proximate to a front passenger-side portion of the vehicle 100. The communication node 102d is positioned and oriented to communicatively couple to the mobile device 104 when the mobile device 104 is proximate to a rear driver-side portion of the vehicle 100. The communication node 102e is position and oriented to communicatively couple to the mobile device 104 when the mobile device 104 is proximate to a rear passenger-side portion of the vehicle 100. The communication node 102f is positioned and oriented to communicatively couple to the mobile device 104 when the mobile device 104 is proximate to a front area of the vehicle 100. Further, the communication node 102g is position and oriented to communicatively couple to the mobile device 104 when the mobile device 104 is proximate to a rear area of the vehicle 100. In the illustrated example, there are six of the exterior nodes 108. In other examples, the vehicle 100 may include more or less of the exterior nodes 108. For example, the vehicle 100 may include more of the exterior nodes 108 than doors.

The communication nodes 102h, 102i of the illustrated example are interior nodes 112 of the communication nodes 102. For example, the interior nodes 112 are utilized to detect when the mobile device 104 is located within the cabin 110 of the vehicle 100. Further, in some examples, the exterior nodes 108 are utilized to detect when the mobile device 104 is approaching and/or near a door of the vehicle 100. In the illustrated example, the interior nodes 112 are positioned and oriented to communicatively couple to the mobile device 104 when the mobile device 104 is located within the cabin 110 of the vehicle 100. Further, the interior nodes 112 may be configured to communicatively couple to the mobile device 104 to enable passive entry into the cabin 110 of the vehicle 100. The communication node 102h of the illustrated example is located near and oriented toward a front portion of the cabin 110 to communicatively couple to the mobile device 104 when the mobile device 104 is within and/or near the front portion of the cabin 110. For example, the communication node 102h of the interior nodes 112 is configured to communicatively couple to the mobile device 104 when the user 106 is in a driver seat of the vehicle 100 to enable passive start of the vehicle 100. Additionally, the communication node 102i of the illustrated example is located near and oriented toward a rear portion of the cabin 110 to communicatively couple to the mobile device 104 when the mobile device 104 is within and/or near the rear portion of the cabin 110. In the illustrated example, there are two of the interior nodes 112. In other examples, the vehicle 100 may include more or less of the interior nodes 112. For example, the vehicle 100 may have a plurality of the interior nodes 112 positioned to monitor the front portion and/or the rear portion of the cabin 110.

Further, the communication node 102a of the illustrated example is a master node that is designated for wireless communication with the other of the communication nodes 102. That is, the communication node 102a is configured to wirelessly communicate with the communication nodes 102b, 102c, 102d, 102e, 102f, 102g, 102h, 102i and is not configured to communicatively couple with the mobile device 104 and/or any other mobile device near the vehicle 100.

The vehicle 100 of the illustrated example includes a controller 114 that manages operability of one or more of the communication nodes 102 for passive-entry passive-start functions of the vehicle 100. For example, the controller 114 monitors signal strengths of test signals sent and received by the communication nodes 102 to determine the functionality of the communication nodes 102. In response to determining that one or more of the communication nodes 102 is impaired, the controller 114 disables one or more passive-entry passive-start functions of the vehicle 100.

As illustrated in FIG. 1B, the vehicle 100 also includes a communication module 116 that includes wired or wireless network interfaces to enable communication with external networks. The communication module 116 also includes hardware (e.g., processors, memory, storage, antenna, etc.)

and software to control the wired or wireless network interfaces. In the illustrated example, the communication module 116 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), etc.). The external network(s) may be a public network, such as the Internet; a private network, such as an intranet; or combinations thereof, and may utilize a variety of networking protocols now available or later developed including, but not limited to, TCP/IP-based networking protocols.

The vehicle 100 of the illustrated example also includes a display 118 and speakers 120. For example, the display 118 presents visual information to the user 106 and/or another vehicle occupant for entertainment and/or informational purposes, and the speakers 120 present audio information for entertainment and/or informational purposes. Further, in some examples, the display 118 is a touchscreen that is configured to receive input from the user 106 and/or another vehicle occupant.

As illustrated in FIG. 1B, the vehicle 100 includes one or more doors 122, one or more door-ajar sensors 124, and a keypad 126. The doors 122 (e.g., including a liftgate) enable the user 106 and/or another vehicle occupant to access the cabin 110 of the vehicle 100. For example, the doors 122 of the vehicle 100 include a front driver-side door, a front passenger-side door, a rear driver-side door, and a rear passenger-side door. Further, the door-ajar sensors 124 are configured to detect when the doors 122 are opened and are closed. In the illustrated example, each of the doors 122 includes a corresponding one of the door-ajar sensors 124 to enable a state (e.g., an open state, a closed state) of each of the doors 122 to be identified. Additionally, the keypad 126 includes buttons for receiving a code from the user 106. For example, the buttons of the keypad 126 are labeled with characters (e.g., numeric characters, alphabetic characters, alphanumeric characters) to enable the user 106 to identify each of the buttons. While the keypad 126 of the illustrated example is located on one of the doors 122, the keypad 126 may be located at any other location along the exterior surface of the vehicle 100. Additionally or alternatively, the keypad 126 may be a virtual keypad whose buttons are projected onto a window of the vehicle 100.

The vehicle 100 of the illustrated example also includes an engine 128, an ignition switch 130, and an ignition switch sensor 132. For example, the engine 128 includes an internal combustion engine, an electric motor, a hybrid engine and/or any other power source that propels movement of the vehicle 100. Further, the ignition switch 130 enables the user 106 and/or another operator of the vehicle 100 to operate the engine 128, a battery, and/or electronic accessories of the vehicle 100. For example, the ignition switch 130 includes an on-position, a start position, and an off-position. In some examples, the ignition switch 130 is a rotary switch and/or a pushbutton that transitions between the ignition switch positions (e.g., the on-position, the start position, the off-position, the accessory position). The ignition switch sensor 132 detects a position of the ignition switch 130. For example, the ignition switch sensor 132 detects whether the ignition switch 130 is in the on-position, the start position, the off-position, or the accessory position.

In the illustrated example, the vehicle 100 also includes a restraint control module 134. For example, the restraint control module 134 is an electronic control unit (ECU) that detects when the vehicle 100 is involved in a collision event and/or a hard braking event and deploys device(s) to restrain position(s) of occupant(s) within the vehicle 100 upon detecting a collision event. For example, upon detecting that the vehicle 100 is involved in a collision event and/or a hard braking event, the restraint control module 134 deploys airbag(s), activates seat belt pretensioner(s), and/or activates webclamp(s) to restrain the occupant(s) within the cabin 110 of the vehicle 100. Further, the restraint control module 134 of the illustrated example includes an accelerometer 136 and/or other impact sensor(s) that monitor for a collision event and/or a hard braking event of the vehicle 100. For example, the accelerometer 136 measures accelerations and/or vibrations of the vehicle 100 to monitor for an occurrence, location, and/or severity of a collision event and/or a hard braking event of the vehicle 100. The vehicle 100 of the illustrated example also includes one or more pressure sensors 138 that are located within and/or next to the doors 122 of the vehicle 100. For example, the pressure sensors 138 are impact sensors that measure changes in pressure and/or vibrations of adjacent portions of the vehicle 100 to monitor for an occurrence, location, and/or severity of a collision event and/or a hard braking event.

In operation, the controller 114 initiates a testing sequence of the communication nodes 102 upon detecting an initiation event. For example, the controller 114 is configured to initiate testing of the communication nodes 102 upon completion of assembly of the vehicle 100. In some examples, the controller 114 is configured to initiate testing at predetermined intervals (e.g., once an hour, once a day, once a week, etc.). In some examples, the controller 114 initiates testing of the communication nodes 102 upon detecting a diagnostics event, a service event (e.g., an oil change, a rotation of tires, etc.) and/or an installation event (e.g., body work, replacement of one or more of the communication nodes 102, etc.) performed on the vehicle 100. In some examples, the controller 114 initiates testing of the communication nodes 102 responsive to the ignition switch sensor 132 detecting a status change (e.g., activation and/or deactivation) of the engine 128 of the vehicle 100. Further, in some examples, the controller 114 initiates testing of the communication nodes 102 each time the controller 114 identifies the vehicle 100 has entered and/or exited a predetermined driving mode (e.g., a valet mode). Additionally or alternatively, the controller 114 is configured to initiate the testing sequence of the communication nodes 102 upon detecting that the vehicle 100 is involved in a collision event and/or a hard braking event. For example, the controller 114 initiates testing of the communication nodes 102 in response to the restraint control module 134, the accelerometer 136, one or more of the pressure sensors 138, and/or any other sensor (e.g., any other impact sensor) detecting that the vehicle 100 is involved in a collision event, a hard braking event, and/or a fuel cut-off event.

To perform the testing sequence of the communication nodes 102, the controller 114 causes one of the communication nodes 102 to send test signals to and receive test signals from the other of the communication nodes 102. In some examples, the communication node 102a that is a master node sends and receives test signals with the other of the communication nodes 102. For example, the communication node 102a (e.g., a first node) sends a first test signal to and receives a second test signal from the communication node 102b (e.g., a second node), sends a third test signal to and receives a fourth test signal from the communication node 102c (e.g., a third node), sends a fifth test signal to and receives a sixth test signal from the communication node 102d (e.g., a fourth node), etc. In other examples, the first node of the communication nodes 102 that sends and receives the test signals for the testing sequence is one of the communication nodes 102 that is configured to communicate with mobile device 104 for passive entry passive start of the vehicle 100. For example, the communication node 102b is the first node that sends test signals to and receives test signals from the communication nodes 102c, 102d, 102e, 102f, 102g, 102h, 102i.

In some examples, the communication nodes 102 are Bluetooth® low-energy modules that send and receive the test signals in an advertising mode of the Bluetooth® communication protocol. For example, the advertising mode includes three fixed frequency channels on which data is transmitted. In other examples, the communication nodes 102 are Bluetooth® low-energy modules and/or Wi-Fi modules that send and receive the test signals in a bonded mode of the Bluetooth® communication protocol and/or Wi-Fi communication protocol, respectively. For example, the Bluetooth® low-energy bonded mode is a secure mode of communication that includes 37 frequency channels on which data is transmitted to deter against potential radio-frequency collisions. In bonded mode, the communication nodes 102 are capable of performing a coordinated hop between the frequency channels, for example, if one of the channels is corrupted by noise.

To determine the operability of the communication nodes 102, the controller 114 identifies signal strengths of the test signals. For example, when the communication node 102a is the first node that sends test signals to and receives test signals from each of the other communication nodes 102 (e.g., the communication nodes 102b, 102c, 102d, 102e, 102f, 102g, 102h, 102i), each of the other communication nodes 102 determines the signal strength of the test signal received from the communication node 102a and the communication node 102a determines the signal strengths of the test signals received from each of the other communication nodes 102. For example, the signal strengths measured by the communication nodes 102 are received signal strength indicators. Further, the controller 114 receives one or more of the signal strengths of the test signals, for example, via wired connections. For example, the communication node 102a that is a master node is structured to include the controller 114 such that the communication nodes 102 that receive the test signal from the communication node 102a provide the corresponding signal strengths back to the communication node 102a via wired connections.

Further, to determine the operability of the communication nodes 102, the controller 114 compares the signal strengths to a threshold signal strength range. For example, when the communication node 102a is the first node that sends test signals to and receives test signals from each of the other communication nodes 102 (e.g., the communication nodes 102b, 102c, 102d, 102e, 102f, 102g, 102h, 102i), the controller 114 compares both the signal strength of the test signal that was sent from the communication node 102a to the communication node 102b and the signal strength of the test signal that was sent from the communication node 102b to the communication node 102a to a threshold signal strength range that corresponds with communication between the communication node 102a and the communication node 102b. In response to determining that one or more of those test signals is outside of the threshold signal strength range (e.g., less than a lower signal strength threshold or greater than an upper signal strength threshold), the controller 114 determines that the communication node 102b is impaired. For example, a communication node is impaired if it does not communicate at an expected signal strength (e.g., within a signal strength range). Further, a communication node may become impaired as a result of becoming dislodged (e.g., due to a collision event, a hard braking event, installation of an aftermarket product, tampering, improper installation or dealer service, etc.) and/or degradation (e.g., due to another object blocking node communication, noise interference, installation of an amplifier, in-field degradation, etc.).

Similarly, the controller 114 compares the signal strength of the test signals to threshold signal strength ranges for communication between the communication node 102a and the other of the communication nodes 102 to determine whether any of the other communication nodes 102 is impaired. For example, the controller 114 compares both the signal strength of the test signal that was sent from the communication node 102a to the communication node 102c and the signal strength of the test signal that was sent from the communication node 102c to the communication node 102a to a threshold signal strength range that corresponds with communication between the communication node 102a and the communication node 102c. In response to determining that one or more of those test signals is outside of the threshold signal strength range (e.g., less than a lower signal strength threshold or greater than an upper signal strength threshold), the controller 114 determines that the communication node 102c is impaired. In some examples, the communication nodes 102 correspond to the same threshold signal strength range. In other examples, the threshold signal strength range for one or more of the communication nodes 102 is different. For example, the threshold signal strength range varies based upon a distance between the communication node 102a and a corresponding one of the other communication nodes 102.

Upon detecting that one or more of the communication nodes 102 is impaired, the controller 114 identifies which of the communication nodes 102 is impaired. Further, the controller 114 at least partially disables passive entry passive start of the vehicle 100 based upon which of the communication nodes 102 is impaired. That is, the controller 114 at least partially disables passive entry passive start in response to determining that one or more of the communication nodes 102 is impaired based upon the signal strengths of the test signals.

In some examples, in response to the controller 114 determining that one of the exterior nodes 108 and/or another of the communication nodes 102 utilized to detect a location of the mobile device 104 outside of the vehicle 100 is impaired, the controller 114 disables passive entry through one of the doors 122 that requires the identified one of the exterior nodes 108 and/or communication nodes 102 to locate the mobile device 104 near that one of the doors 122 (e.g., one of the doors 122 adjacent to the impaired one of the exterior nodes 108). For example, the communication nodes 102b, 102c, 102f, 102h may be utilized for passive entry through the front driver-side door of the vehicle 100. In such examples, if the controller 114 detects that one or more of the communication nodes 102b, 102c, 102f, 102h utilized to detect a presence of the mobile device 104 near the front driver-side door is impaired, the controller 114 disables passive entry through the front driver-side door. Further, in some examples, the controller 114 permits passive entry through each of the other doors 122 for which the controller 114 can locate the mobile device 104 as being near without utilization of the impaired one of the communication nodes 102 (e.g., those of the doors 122 that are spaced apart from the impaired one of the exterior nodes 108). For example, if the controller 114 identifies that one or more of the communication nodes 102b, 102c, 102f, 102h is impaired, the controller 114 disables passive entry through the front driver-side door of the vehicle 100 and permits passive entry through one or more of the other doors 122 of the vehicle 100. Additionally or alternatively, the controller 114 sends an instruction to the user 106 to enter the cabin 110 of the vehicle 100 in another manner. For example, if the controller 114 identifies that the communication node 102b is impaired, the controller 114 sends an instruction to the user 106 to enter the cabin 110 through the front driver-side door in another manner (e.g., utilizing the keypad 126, a mechanical key, etc.) and/or to enter the cabin 110 through another one of the doors 122. The controller 114 sends the instruction to the mobile device 104 of the user 106, for example, via one or more of the communication nodes 102 that is not impaired and/or the communication module 116.

In some examples, in response to the controller 114 determining that one or more of the interior nodes 112 and/or another one the communication nodes 102 utilized to detect a location of the mobile device 104 within the cabin 110 of the vehicle 100 is impaired, the controller 114 disables passive start of the engine 128 of the vehicle 100. For example, the controller 114 disables passive start in response to identifying that one or more of the communication nodes 102b, 102c, 102h is impaired. Additionally or alternatively, the controller 114 sends an instruction to the user 106 to start the engine 128 of the vehicle 100 in another manner (e.g., utilizing a mechanical key, entering a passcode via a vehicle touchscreen, sending a "start" signal from the mobile device 104, providing an input via the ignition switch 130). For example, the controller 114 presents the instruction via the display 118 and/or the speakers 120 and/or sends the instruction to the mobile device 104.

Figure 2:
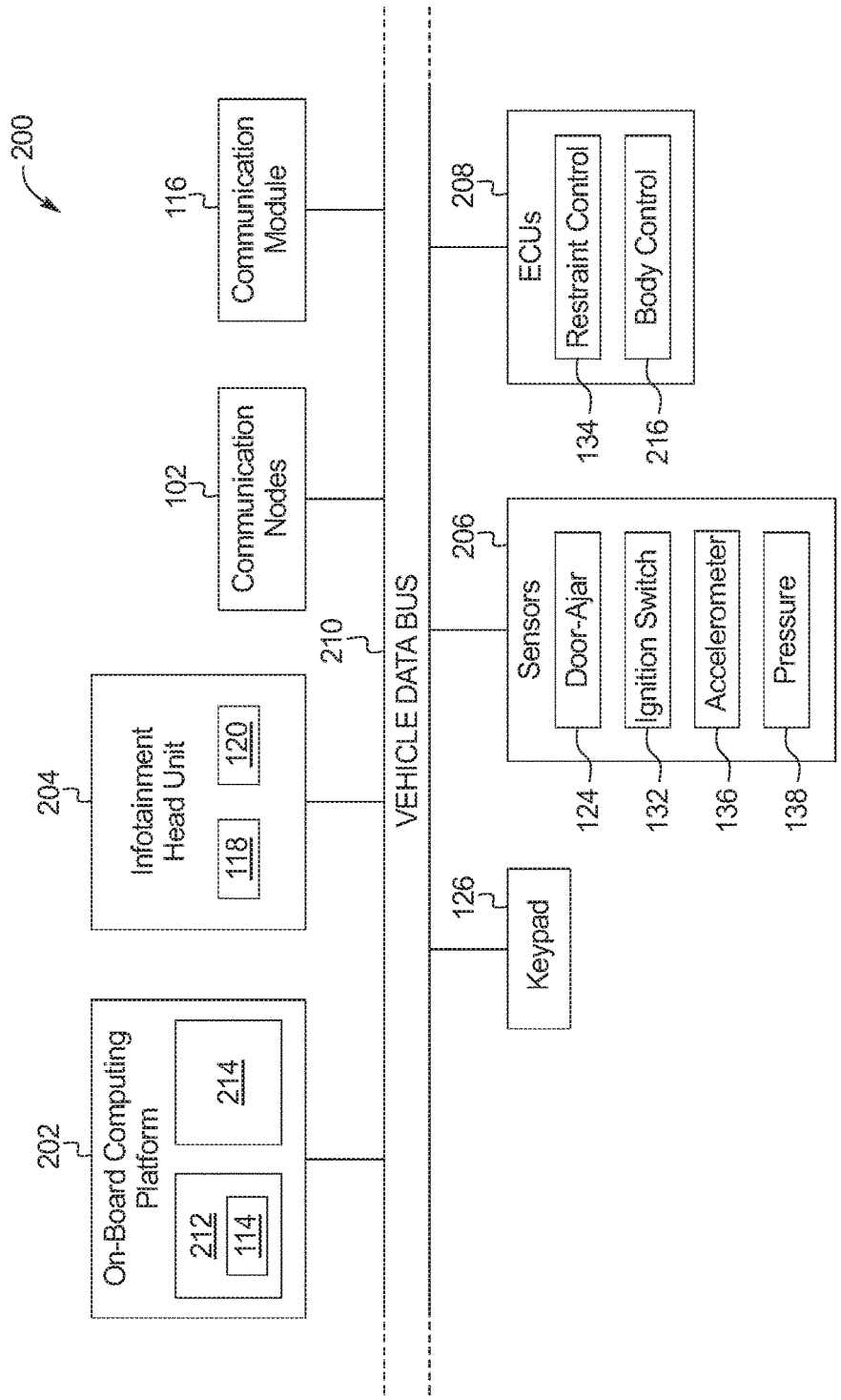
FIG. 2 is a block diagram of electronic components of the vehicle of FIGS. 1A-1B.

FIG. 2 is a block diagram of electronic components 200 of the vehicle 100. As illustrated in FIG. 2, the electronic components 200 include an on-board computing platform 202, an infotainment head unit 204, the communication nodes 102, the communication module 116, the keypad 126, sensors 206, electronic control units (ECUs) 208, and a vehicle data bus 210.

The on-board computing platform 202 includes a processor 212 and memory 214. In some examples, the processor 212 of the on-board computing platform 202 is structured to include the controller 114. Alternatively, in some examples, the controller 114 is incorporated into another electronic control unit (ECU) (e.g., a body control module) and/or one of the communication nodes 102 with its own processor 212 and memory 214. The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 204 provides an interface between the vehicle 100 and a user. The infotainment head unit 204 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, the display 118 (e.g., a heads-up display, a center console display such as a liquid crystal display (LCD), an organic light emitting diode (OLED) display, a flat panel display, a solid state display, etc.), and/or the speakers 120. In the illustrated example, the infotainment head unit 204 includes hardware (e.g., a processor or controller, memory, storage, etc.) and software (e.g., an operating system, etc.) for an infotainment system (such as SYNC® and MyFord Touch® by Ford®, etc.). Additionally, the infotainment head unit 204 displays the infotainment system on, for example, the display 118.

The sensors 206 are arranged in and around the vehicle 100 to monitor properties of the vehicle 100 and/or an environment in which the vehicle 100 is located. One or more of the sensors 206 may be mounted to measure properties around an exterior of the vehicle 100. Additionally or alternatively, one or more of the sensors 206 may be mounted inside a cabin of the vehicle 100 or in a body of the vehicle 100 (e.g., an engine compartment, wheel wells, etc.) to measure properties in an interior of the vehicle 100. For example, the sensors 206 include accelerometers, odometers, tachometers, pitch and yaw sensors, wheel speed sensors, microphones, tire pressure sensors, biometric sensors and/or sensors of any other suitable type. In the illustrated example, the sensors 206 include the door-ajar sensors 124, the ignition switch sensor 132, the accelerometer 136, and the pressure sensors 138. Additionally or alternatively, the sensors 206 include one or more sensors that record a temperature and/or a humidity of an environment in which the vehicle 100 is located. In such examples, the controller 114 utilizes the measurements of those sensor(s) to normalize signal strength measurements (e.g., RSSIs) with baselines readings stored in the on-board computing platform 202.

The ECUs 208 monitor and control the subsystems of the vehicle 100. For example, the ECUs 208 are discrete sets of electronics that include their own circuit(s) (e.g., integrated circuits, microprocessors, memory, storage, etc.) and firmware, sensors, actuators, and/or mounting hardware. The ECUs 208 communicate and exchange information via a vehicle data bus (e.g., the vehicle data bus 210). Additionally, the ECUs 208 may communicate properties (e.g., status of the ECUs 208, sensor readings, control state, error and diagnostic codes, etc.) to and/or receive requests from each other. For example, the vehicle 100 may have seventy or more of the ECUs 208 that are positioned in various locations around the vehicle 100 and are communicatively coupled by the vehicle data bus 210.

In the illustrated example, the ECUs 208 include the restraint control module 134 and a body control module 216. For example, the restraint control module 134 includes one or more sensors, such as the accelerometer 136, to detect a collision event and/or a severe braking event of the vehicle 100. Further, the restraint control module 134 controls one or more subsystems throughout the vehicle 100 configured to restrain movement of passenger(s) within the cabin 110 of the vehicle 100. For example, the restraint control module 134 controls deployment of airbag(s), activation of pretensioner(s) and/or webclamp(s) of seatbelt(s), and/or utilization of other restraint mechanism(s) upon detection of a collision event and/or a severe braking event of the vehicle 100. Further, the body control module 216 controls one or more subsystems throughout the vehicle 100, such as power windows, power locks, an immobilizer system, power mirrors, etc. For example, the body control module 216 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 210 communicatively couples the communication nodes 102, the communication module 116, the keypad 126, the on-board computing platform 202, the infotainment head unit 204, the sensors 206, and the ECUs 208. In some examples, the vehicle data bus 210 includes one or more data buses. The vehicle data bus 210 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
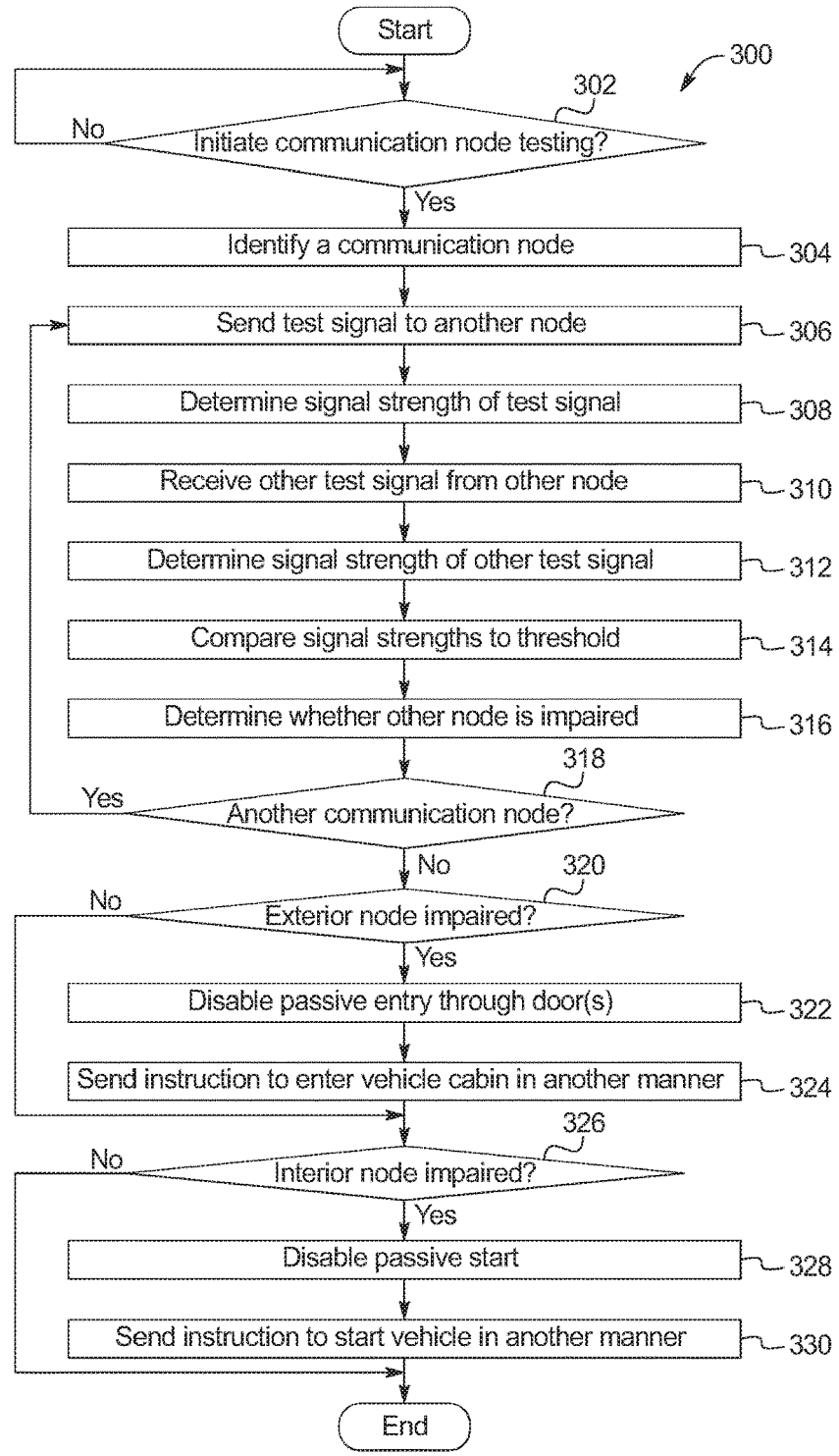
FIG. 3 is a flowchart for testing a status of wireless communication nodes of a vehicle in accordance with the teachings herein.

FIG. 3 is a flowchart of an example method 300 to test statuses of wireless communication nodes of a vehicle. The flowchart of FIG. 3 is representative of machine readable instructions that are stored in memory (such as the memory 214 of FIG. 2) and include one or more programs which, when executed by a processor (such as the processor 212 of FIG. 2), cause the vehicle 100 to implement the example controller 114 of FIGS. 1A-2. While the example program is described with reference to the flowchart illustrated in FIG. 3, many other methods of implementing the example controller 114 may alternatively be used. For example, the order of execution of the blocks may be rearranged, changed, eliminated, and/or combined to perform the method 300. Further, because the method 300 is disclosed in connection with the components of FIGS. 1A-2, some functions of those components will not be described in detail below.

Initially, at block 302, the controller 114 determines whether to initiate testing of the communication nodes 102 of the vehicle 100. For example, the controller 114 initiates testing of the communication nodes 102 at predetermined time(s) each day, week, and month. Additionally or alternatively, the controller 114 initiates testing of the communication nodes 102 upon detecting a service event, an installation event, ignition of the engine 128, deactivation of the engine 128, a collision event, and/or completion of assembly. In response to the controller 114 determining not to initiate testing of the communication nodes 102, the method 300 remains at block 302. Otherwise, in response to the controller 114 determining to initiate testing of the communication nodes 102, the method 300 proceeds to block 304.

At block 304, the controller 114 identifies a first of the communication nodes 102 (e.g., a first communication node). For example, the first of the communication nodes 102 identified by the controller 114 is a master node that is utilized to test the functionality of each of the other communication nodes 102. At block 306, the first of the communication nodes 102 sends a test signal (e.g., a first test signal, a first of test signals) to another one of the communication nodes 102 (e.g., a second communication node). At block 308, the controller 114 determines a signal strength of the test signal. For example, the controller 114 determines the signal strength via an RSSI of the test signal. At block 310, the first of the communication nodes 102 receives another test signal (e.g., a second test signal, a second of the test signals) from the other one of the communication nodes 102. At block 312, the controller 114 determines a signal strength of the other test signal. For example, the controller 114 determines the signal strength via an RSSI of the other test signal.

At block 314, the controller 114 compares the signal strengths of the test signals to a predetermined signal strength range. At block 316, the controller 114 determines whether the other one of the communication nodes 102 is impaired upon comparing the signal strengths of the test signals to the predetermined signal strength range. For example, the controller 114 determines that the other one of the communication nodes 102 is impaired in response to identifying that one or more of the signal strengths of the test signals is less than a first threshold signal strength or greater than a second threshold signal strength. Further, at block 318, the controller 114 determines whether there is another of the communication nodes 102. In response to the controller 114 determining that there is another of the communication nodes 102, the method 300 returns to block 306. Otherwise, in response to the controller 114 determining that there is not another of the communication nodes 102, the method 300 proceeds to block 320.

At block 320, the controller 114 determines whether one or more of the exterior nodes 108 and/or other communication nodes 102 utilized to detect a location of the mobile device 104 outside of the vehicle 100 was identified at block 316 as being impaired. In response to the controller 114 determining that none of the exterior nodes 108 and/or other communication nodes 102 utilized for passive entry was identified as being impaired, the method 300 proceeds to block 326. Otherwise, in response to the controller 114 determining that one or more of the exterior nodes 108 and/or other communication nodes 102 utilized for passive entry was identified as being impaired, the method 300 proceeds to block 322 at which the controller 114 disables passive entry through one or more of the doors 122 that are adjacent to the one or more of the exterior nodes 108 and/or other communication nodes 102 identified as being impaired. For example, if the controller 114 identifies that the communication node 102b is impaired, the controller 114 disables passive entry through the front driver-side door of the vehicle 100. At block 324, the controller 114 sends an instruction to the user 106 to enter the cabin 110 of the vehicle 100 in another manner. For example, if the controller 114 identifies that the communication node 102b is impaired, the controller 114 sends an instruction to the user 106 to enter the cabin 110 through the front driver-side door in another manner (e.g., utilizing the keypad 126, a mechanical key, etc.) and/or to enter the cabin 110 through another one of the doors 122. The controller 114 sends the instruction to the mobile device 104 of the user 106, for example, via one or more of the communication nodes 102 and/or the communication module 116.

At block 326, the controller 114 determines whether one or more of the interior nodes 112 and/or other communication nodes 102 utilized to detect the mobile device 104 within the cabin 110 was identified at block 316 as being impaired. In response to the controller 114 determining that none of the interior nodes 112 and/or other communication nodes 102 utilized for passive start was identified as being impaired, the method 300 ends. Otherwise, in response to the controller 114 determining that one or more of the interior nodes 112 and/or other communication nodes 102 utilized for passive start was identified as being impaired, the method 300 proceeds to block 328 at which the controller 114 disables passive start of the engine 128 of the vehicle 100. For example, the controller 114 disables passive start in response to identifying that the communication node 102h is impaired. At block 330, the controller 114 sends an instruction to the user 106 to start the engine 128 of the vehicle 100 in another manner (e.g., utilizing a mechanical key). For example, the controller 114 presents the instruction via the infotainment head unit 204 and/or sends the instruction to the mobile device 104.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   communication nodes including a first node and a second node, the first node to send a first of test signals to and receive a second of the test signals from the second node, the communication nodes include an exterior node configured to wirelessly communicate with a mobile device to initiate passive entry into a vehicle cabin; and
   a controller to:
   determine signal strengths of the test signals; and
   at least partially disable passive entry passive start responsive to determining one or more of the communication nodes is impaired based upon the signal strengths.

2. The vehicle of claim 1, wherein the controller determines that one of the communication nodes is impaired responsive to identifying that one of the signal strengths corresponding to the one of the communication nodes is less than a first threshold signal strength or greater than a second threshold signal strength.

3. The vehicle of claim 1, wherein the communication nodes include short-range wireless communication modules.

4. The vehicle of claim 1, wherein the first node is a master node dedicated for communication with other of the communication nodes.

5. The vehicle of claim 1, wherein the first node is configured to communicate with the mobile device for passive entry passive start.

6. The vehicle of claim 1, wherein the communication nodes send the test signals in a bonded mode of at least one of a Bluetooth® low-energy communication protocol and a Wi-Fi communication protocol.

7. The vehicle of claim 1, wherein the communication nodes further include a third node, the first node is to send a third of the test signals to and receive a fourth of the test signals from the third node.

8. The vehicle of claim 1, wherein the controller is to disable passive entry through a first vehicle door adjacent to the exterior node responsive to identifying that the exterior node is impaired.

9. The vehicle of claim 8, wherein the controller is to permit passive entry through a second vehicle door spaced apart from the exterior node that is impaired.

10. The vehicle of claim 8, wherein the controller is to provide an instruction to a user of the mobile device to access the vehicle cabin in another manner other than passive entry through the first vehicle door.

11. A vehicle of comprising:
    communication nodes including a first node and a second node, the first node to send a first of test signals to and receive a second of the test signals from the second node, the communication nodes include an interior node configured to wirelessly communicate with a mobile device within a vehicle cabin to initiate passive start of a vehicle engine; and
    a controller to:
    determine signal strengths of the test signals; and
    at least partially disable passive entry passive start responsive to determining one or more of the communication nodes is impaired based upon the signal strengths.

12. The vehicle of claim 11, wherein the communication nodes include an exterior node configured to wirelessly communicate with the mobile device to initiate passive entry into the vehicle cabin.

13. The vehicle of claim 11, wherein the controller is to disable passive start of the vehicle engine responsive to identifying that the interior node is impaired.

14. The vehicle of claim 11, wherein the controller is to provide an instruction to a user of the mobile device to start the vehicle engine in another manner other than passive start.

15. A vehicle comprising:
communication nodes including a first node and a second node, the first node to send a first of test signals to and receive a second of the test signals from the second node;
a controller to:
  determine signal strengths of the test signals; and
  at least partially disable passive entry passive start responsive to determining one or more of the communication nodes is impaired based upon the signal strengths; and
an ignition switch sensor to monitor a status of a vehicle engine, the communication nodes to send the test signals responsive to the ignition switch sensor detecting a status change of the vehicle engine.

16. A vehicle comprising:
communication nodes including a first node and a second node, the first node to send a first of test signals to and receive a second of the test signals from the second node;
a controller to:
  determine signal strengths of the test signals; and
  at least partially disable passive entry passive start responsive to determining one or more of the communication nodes is impaired based upon the signal strengths; and
an impact sensor to monitor for a vehicle collision event and a hard braking event, the communication nodes to send the test signals responsive to the impact sensor detecting at least one of the vehicle collision event and the hard braking event.

17. A vehicle comprising:
communication nodes including a first node and a second node, the first node to send a first of test signals to and receive a second of the test signals from the second node;
a controller to:
  determine signal strengths of the test signals; and
  at least partially disable passive entry passive start responsive to determining one or more of the communication nodes is impaired based upon the signal strengths; and
a sensor configured to record at least one of a temperature measurement and a humidity measurement that is utilized by the controller to normalize the signal strengths with baselines readings.

18. A method comprising:
sending a first of test signals from a first node to a second node of communication nodes;
receiving a second of the test signals at the first node from the second node;
determining, via a processor, signal strengths of the test signals; and
at least partially disabling passive entry passive start responsive to determining one or more of the communication nodes is impaired based upon the signal strengths.

19. The method of claim 18, further including determining one of the communication nodes is impaired responsive to identifying that one of the signal strengths corresponding to the one of the communication nodes is less than a first threshold signal strength or greater than a second threshold signal strength.

20. The method of claim 18, wherein at least partially disabling passive entry passive start includes at least one of disabling passive entry through a vehicle door adjacent to an exterior node of the communication nodes responsive to identifying that the exterior node is impaired and disabling passive start of a vehicle engine responsive to identifying that an interior node of the communication nodes is impaired.

* * * * *